US009919243B2

(12) United States Patent
Cherry et al.

(10) Patent No.: US 9,919,243 B2
(45) Date of Patent: Mar. 20, 2018

(54) METHOD AND SYSTEM OF COMPRESSING GAS WITH FLOW RESTRICTIONS

(71) Applicant: Carnot Compression, LLC, Scotts Valley, CA (US)

(72) Inventors: Mark A. Cherry, Sandpoint, ID (US); Robert A. Alderman, Sagle, ID (US); D. Hans Shillinger, Nevada, CA (US)

(73) Assignee: Carnot Compression, LLC, Scotts Valley, CA (US)

( * ) Notice: Subject to any disclaimer, the term of this patent is extended or adjusted under 35 U.S.C. 154(b) by 294 days.

(21) Appl. No.: 14/880,378

(22) Filed: Oct. 12, 2015

(65) Prior Publication Data

US 2016/0102673 A1 Apr. 14, 2016

Related U.S. Application Data

(60) Provisional application No. 62/222,261, filed on Sep. 23, 2015, provisional application No. 62/063,463, filed on Oct. 14, 2014.

(51) Int. Cl.
*F04D 17/18* (2006.01)
*B01D 19/00* (2006.01)
(Continued)

(52) U.S. Cl.
CPC ....... *B01D 19/0057* (2013.01); *F04D 17/167* (2013.01); *F04D 17/18* (2013.01); *F04D 31/00* (2013.01); *F04F 5/06* (2013.01)

(58) Field of Classification Search
CPC .................................. F04D 17/18; F04D 31/00
See application file for complete search history.

(56) References Cited

U.S. PATENT DOCUMENTS 1,864,640 A * 6/1932 Dalrymple .............. F04C 19/00
417/68
2,025,037 A * 12/1935 Bergmann .............. F04D 17/18
417/118
(Continued)

FOREIGN PATENT DOCUMENTS

DE 1106028 5/1961
DE 2356013 5/1975
(Continued)

OTHER PUBLICATIONS

European Supplementary Examination Report, dated Jun. 23, 2016.
(Continued)

*Primary Examiner* — Patrick Hamo
(74) *Attorney, Agent, or Firm* — Robert C. Kain, Jr.

(57) ABSTRACT

The gas compression method/system restricts flow of emulsified liquid-gas mixture through many substantially radial capillary tube-passages in a rotating disk by either one-way valves, narrowing the passages, hydraulic impedance and/or reinforcement of coriolis forces in terminal end tail segments of the capillary passages. Compressed gas is released from peripherally collected compressed gas-liquid emulsion (beyond the terminal ends of the tubes) in a arcuate peripheral disc space when the compressed gas bubbles emerge from the peripherally collected emulsion. A compressed gas drain draws off gas from the peripheral space. Liquid drain draws off liquid from the space. In different embodiments, radial outboard flow through the capillaries is effected by various one-way valves which may be a single valve in the passage or multiple valves. Coriolis force in tail segments is enhanced by angular displacement in the direction of rotation. Valves may be used in combination with such tail-end segments.

16 Claims, 14 Drawing Sheets

(51) Int. Cl.
*F04D 17/16* (2006.01)
*F04D 31/00* (2006.01)
*F04F 5/06* (2006.01)

(56) References Cited

U.S. PATENT DOCUMENTS

| | | | |
|---|---|---|---|
| 2,076,586 A | | 4/1937 | Noble |
| 2,260,600 A | | 10/1941 | Boeckeler |
| 3,517,229 A | | 6/1970 | Bidard |
| 3,559,419 A | | 2/1971 | Kantor |
| 3,584,978 A | | 6/1971 | Saburo |
| 4,027,993 A | * | 6/1977 | Wolff ............... F01K 25/04 261/DIG. 26 |
| 5,011,371 A | | 4/1991 | Gottemoller |
| 5,154,583 A | * | 10/1992 | Althaus ............... F04F 13/00 417/64 |
| 5,733,253 A | | 3/1998 | Headley |
| 6,713,028 B1 | | 3/2004 | Oklejas, Jr. |
| 7,905,360 B2 | * | 3/2011 | Della Casa ........ B01D 17/0208 210/380.1 |
| 9,618,013 B2 | * | 4/2017 | Cherry ............ B01D 19/0057 |
| 2003/0106302 A1 | | 6/2003 | Ray |
| 2004/0101414 A1 | | 5/2004 | Gharib et al. |
| 2004/0197195 A1 | | 10/2004 | Ogolla et al. |
| 2005/0047270 A1 | | 3/2005 | Wood et al. |
| 2005/0175449 A1 | | 8/2005 | Yonehara |
| 2006/0059904 A1 | | 3/2006 | Shevket |
| 2011/0115223 A1 | * | 5/2011 | Stahlkopf ............... F01K 13/02 290/7 |

FOREIGN PATENT DOCUMENTS

| | | |
|---|---|---|
| EP | 0 096 713 B1 | 6/1983 |
| FR | 2248731 | 5/1975 |
| WO | WO 1983/02134 | 6/1983 |

OTHER PUBLICATIONS

Notification of Transmittal of the International Search Report PCT/US2015/055427, dated Feb. 2, 2016.

Phasor Analysis of Linear Mechanical Systems and Linear Differential Equations ME104, Prof. B. Paden.

EA3: Systems Dynamics, V1.7 Weakly-Coupled Oscillators, Sridhar Krishnaswamy.

A guide to Mechanical Impedance and Structural Response Techniques, Bruel & Kjaer.

\* cited by examiner

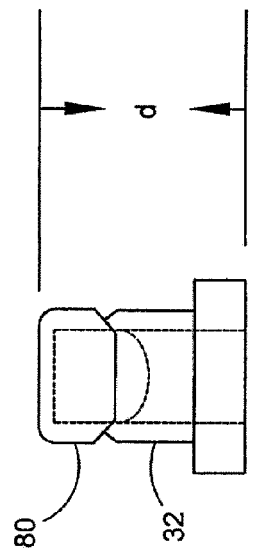
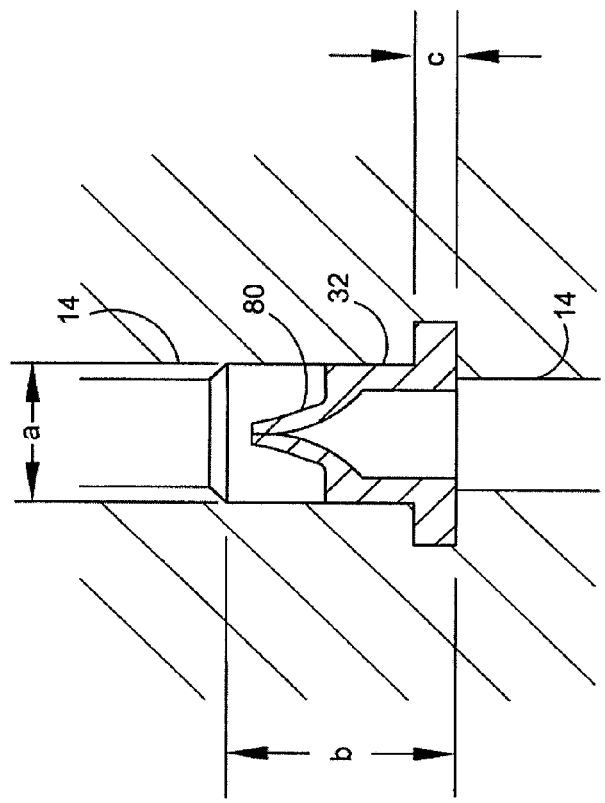

METHOD AND SYSTEM OF COMPRESSING GAS WITH FLOW RESTRICTIONS

This is a regular patent application claiming priority of provisional patent application Ser. No. 62/222,261, filed Sep. 23, 2015 and provisional patent application Ser. No. 62/063,463, filed Oct. 14, 2014, and the contents thereof is incorporated herein by reference thereto.

The present invention relates to a method of compressing gas using flow restriction technology and gas compressors with such technology.

CROSS REFERENCED RELATED APPLICATION

The present method of compressing gas and gas compressor is related to U.S. patent application Ser. No. 14/280,780 filed May 19, 2014, published as U.S. Patent Publication US 2015/0023807 on Jan. 22, 2015, entitled Centrifugal Gas Compressor Method and System, the contents of which is incorporated herein by reference thereto.

BACKGROUND OF THE INVENTION

Gas compressors are used for many items in the consumer market (to inflate basketballs, toys and tires) and in the industrial market (to compress gas for transport, for powering pneumatic tools and for distributing natural gas from the well head to the user).

The efficiency of prior art commercial gas compressors is poor primarily because practicalities require that the gas be compressed rapidly. Rapid compression makes it nearly impossible to dissipate the heat of compression during the compression process. This inherent heating during the compression process (herein "C-heat") demands up to 100% more physical work from the prime mover than if the same process was done with complete and immediate "C-heat" removal. Typically the prime mover is an internal combustion engine or an electric motor. A rapid compression process with little or no C-heat removal is called an adiabatic compression. Most state of the art compressors operate with adiabatic or semi-adiabatic compression cycles. The energy or work lost due to C-heat increases as the final target pressure for the compressor increases.

The work potential of the isothermally compressed gas is roughly equivalent to the work required to compress the gas. However, most compressed gas is stored in an uninsulated pressure vessel and the time between the compression of the gas and the use of the gas makes retention of the heat in the gas impractical. Therefore, this 50-100% additional work to overcome the C-heat while compressing the gas is lost or wasted. Compression performed while immediately removing all of the C-heat is called isothermal compression. If isothermal compression can be achieved, the energy required to compress gas to a given pressure could theoretically be cut nearly in half. Stated otherwise, twice the amount of compressed gas could be produced for the same cost in energy or dollars. Historically isothermal compression has been impractical or impossible to achieve because the C-heat removal from the compressed gas requires too much time and/or additional energy for practical use.

One prior art references discusses a compressor with rapid isothermal compression. U.S. Pat. No. 892,772 to Taylor, patented in 1908, discloses a hydraulic air compressor which utilizes a falling column of water infused with millions of tiny spherical bubbles. When the column of water falls from a particular height, the bubbles in the water are compressed. Taylor used a 70 foot differential head pressure (about 21 meters) which creates roughly 30 PSI differential pressure to drive the compression process. Taylor used a 290 foot (about 88 meters) tall tail race to create and maintain approximately 128 psi (pounds per square inch) pressure to drive 5000-6000 horsepower isothermal compressors.

U.S. patent Ser. No. 14/280,780, filed May 19, 2014, (incorporated herein by reference thereto), U.S. Patent Application Publication No. 20150023807 (published Jan. 22, 2015) to Cherry et al discloses a centrifugal compressor that compresses gas in capillaries leading to a radially distant annular container space. Centrifugal force acts on gas bubbles entrained between liquid slugs moving radially outward (distally) through the capillary compression tubes which may be radial, tangential or continuously curved. Compressed gas is collected in an annular pressurized gas separation and storage chamber, whereupon it is harvested for industrial use. At the input side, a gas-liquid emulsion is fed to the capillary compression tubes by an inboard emulsification device. The emulsification device may include a vortex generator, an ejector or a venturi injector, all feeding the gas-liquid mixture into the inboard ports of the capillaries. The capillaries are formed in a series of discs, coaxially stacked with outer disc ends open to the annular disc space.

U.S. Pat. No. 6,276,140 to Keller discloses a device to generate energy through a turbine engine. The Keller device also uses falling water fed through a funnel shaped vertical tube or tunnel in order to compress air bubbles in the falling water. The waterfall drop in Keller was between 30-100 meters. Typical diameters at the top of the Keller funnel tube are approximately 2-7 meters and, at the bottom, the funnel outlet region is typically 0.7-2.0 meters.

U.S. Pat. No. 1,144,865 to Rees discloses a rotary pump, condenser and compressor. The Rees '865 rotary pump compressor utilizes large cavities having highly curved shaped walls and the cavities are not radial with respect to the rotating container.

U.S. Patent Application Publication No. 2011/0030359 to Fong generally discusses a centrifugal separator. U.S. Patent Application Publication No. 2011/0115223 to Stahlkopf also discusses centrifugal separators. Neither Fong '359 or Stahlkopf '223 discuss a centrifugal compressor which compresses bubbles in water or a liquid in an isothermal manner to extract the compressed air or gas.

U.S. Pat. No. 1,769,260 to Hughes discloses a centrifugal pump and condenser that uses capillary tubes to compress gas bubbles. However the manner in which Hughes creates a bubble train results in much longer and larger bubbles—with correspondingly greater bubble buoyancy—such that it is very difficult to force the bubbles towards the distal end of the compression tube. Hughes' shroud is a trough that collects water as it leaves the capillary chambers. The trough fills with water trapped due to centrifugal force at a depth determined by the inward facing flanges. Water which passes over these flanges is drained to the inside wall of a stationary cylindrical casing. The radially outboard ends of the capillary chambers extend radially beyond the internal diameter of the inwardly facing flanges creating a gas seal.

Hughes' shroud design has no significant pressure differential. Although Hughes' shroud acts as a seal by throwing the gas-liquid mixture at the radially remote inboard walls, the shroud design does not act as a rectifying agent to force unidirectional distal flow of entrained bubbles. Hughes's shroud design also does not provide a pressurized gas storage housing and a gas/liquid separation chamber. Hughes also does not disclose a method of recovering the kinetic energy imparted to the water by the impeller, therefore the gains of isothermal compression would be wasted on the energy imparted to the water.

SUMMARY

The present inventive method of compressing gas and the gas compressor (1) creates and enforces distally unidirectional emulsion flow through the capillary compression tubes and (2) maintains in some embodiments, bubble-tube wall, full diameter contact throughout the critical section of the capillary tubes in a centrifugal bubble compressor.

The present method creates, enforces and enhances distally oriented unidirectional emulsion flow in the capillary compression tubes through the use of: mechanical checking of radially inboard flow, dynamic enforcement of distal radially outboard emulsion flow, checking bubble buoyancy towards the inboard or proximal ends of the tubes, countering emulsion exit velocity, and tapering the tube diameters longitudinally to match the rate of bubble diameter reduction during compression.

Emulsion flow or gas bubble "slip" in the proximal direction (towards the axis of rotation) represents work lost by the device.

Fully checked or rectified (nonreversible) emulsion flow through capillary compression tubes in a generally radially outboard direction is unidirectional by definition. Its velocity may vary or even stop, but flow can only proceed in one direction. Mechanical checking mechanisms are one method class that can be added to the capillary compression tubes to create complete distally oriented unidirectional emulsion flow.

Enforced distally oriented unidirectional emulsion flow through capillary compression tubes occurs when a method is employed which guards against reverse flow. Rotating dedicated ejector mechanisms and capillary compression tubes that have a tapered diameter are two method classes that can be added to the capillary compression tubes in this device to enforce complete distally oriented unidirectional emulsion flow.

Enhanced distally oriented unidirectional emulsion flow through capillary compression tubes occurs when the inventive method is employed to increase the flow rate of emulsion. Bent end compression tubes are one method class that can be added to the capillary compression tubes in this device to enhance distally oriented unidirectional emulsion flow.

The use of any of these methods, individually or in combination, greatly enhances the productivity and efficiency of the gas compressor.

In summary, the method of compressing gas with restricted flow characteristics, restricting backflow to radially inward capillary segments, initially emulsifies a gas input and a liquid input to provide an emulsified liquid-gas mixture. The emulsified liquid-gas mixture is introduced into radially inboard ends of a plurality of capillary passages formed in a rotating disk. The radially outboard capillary passage ends terminate in one or more arcuate peripheral container space disc regions in the disc. Entrained gas bubbles are compressed in the capillary tubes as the liquid and compressed gas passes through the capillaries and moves radially outward to the terminal capillary ends and the arcuate peripheral disc space. Flow is restricted in the proximal direction, limiting substantially radially inboard flow through the capillary passages. Compressed gas is released from the compressed gas-liquid emulsion in said arcuate peripheral disc space when the compressed gas bubbles emerge from the peripherally collected emulsion.

Restricted flow, limiting radially inboard flow and promoting radially outboard flow through the capillaries, is effected by one or more: mechanical check valves; a one-way valves; a swing valves; a duck-bill valves; a lift check valves; an in-line check valves; a flap valves; a ball valves; a tilt disc valve; and rectifying flow valves. Otherwise, or in addition to, restricted one-way flow is created in the capillary passages or capillary tubes by a reduction or narrowing of the physical size of the capillary passages along longitudinal segments of the multiple capillary tubes. This maintains water piston/slug isolation, thereby nearly eliminating bubble buoyancy.

Further, substantially one way flow, by restricting back flow is achieved by hydraulic impedance formed in the capillary passages which promotes radially outboard flow through the passages or tubes. This is directionally specific impedance to radially inboard back flow. There is high impedance to radially inboard flow and this high impedance is created in the capillary tubes. Another technologic characteristic limits radially inboard flow and promotes radially outboard flow by establishing a coriolis force in terminal end tail segments of the capillary passages. The coriolis force is enforced and strengthened in tail end segments which are angularly displaced in the direction of rotation of the disc (at about 90 degrees or greater angular displacement from upstream capillary passage axial centerlines). Sometimes the tail end segment will track along the inboard side wall of the arcuate peripheral disc space. In the generally radially aligned capillary tubes, the coriolis force effect opposes the radially outboard or distally directed movement of the liquid-gas bubble unit. The bent tail end enforces the coriolis forces and moves the liquid-gas bubble units to the distal end of the tube.

A centrifugal gas compressor is also disclosed. The gas compressor is fed with a gas and a liquid. The compressor includes a rotating container with a plurality of discs rotated by a prime mover about an axis. A radially inboard emulsification device in the compressor is supplied with the input gas and the input liquid and creates an emulsified liquid-gas mixture. The discs either form or carry a plurality of substantially radial capillary passages having radially inboard ends with radially inboard ports accepting the emulsified liquid-gas mixture from the emulsification device. As used herein, the term "substantially radial" in respect to the capillary passages has the same meaning as that in patent application Ser. No. 14/280,780. The capillary passages have outboard terminal ends which terminate in one or more arcuate peripheral container space disc regions in the compressor.

The gas compressor restricts the flow of entrained gas bubbles and liquid in the capillary passages in one direction, thereby promoting flow in the distal direction ("unidirectional flow), such that the entrained bubbles are compressed as the same passes through the capillary passages and moves radially outward the terminal capillary ends and the arcuate peripheral spaces. The flow restriction in the capillary passages is effected by one or more of: a mechanical check valve, a one-way valve, a swing valve, a duck-bill valve, a lift check valve, an in-line check valve, a flap valve, a ball valve a tilt disc valve, a rectifying flow valve, a narrowing of the capillary passages and a reduction of the physical size of the capillary passages along a respective longitudinal segment thereof. This flow restriction causes substantially unidirectional radially outward flow of compressed entrained gas bubbles and liquid into the arcuate peripheral disc space. One or more gas drains from the arcuate peripheral disc space draws off the compressed gas from the space. Also, one or more liquid drains from the arcuate peripheral space draws off liquid from the space. As a result of buoyancy, compressed gas bubbles emerge from the liquid in the arcuate peripheral spaces and are drawn off at the compressed gas ports.

The capillary passages may have, in combination with the flow restriction elements or without these flow restriction elements, terminal end tail segments which are angularly displaced in the direction of rotation of the disc. Sometimes, the tail end segments are curved at about 90 degrees or more from upstream capillary passage axial centerlines and/or have an angular displacement at least 90 degrees from upstream capillary passage axial centerlines.

Another centrifugal gas compressor, fed with gas and liquid includes the rotating container or stack of discs, the prime mover, and the inboard emulsification device creating an emulsified liquid-gas mixture. In this compressor, restricted flow is effected or achieved and substantially one-way distal flow provided by terminal end tail segments that are angularly displaced in the direction of rotation of the disc. The flow restriction (limiting back flow) causes outward flow of compressed entrained gas bubbles and liquid from the end tail segments and the terminal capillary ends into said arcuate peripheral spaces.

OBJECTS OF THE INVENTION

It an object of the present invention to provide a method and system of compressing gas with directional flow restrictions causing distally directed flow.

It is a further object of the invention to provide such method and system with isothermal compression.

BRIEF DESCRIPTION OF THE DRAWINGS

Further objects and advantages of the present invention can be found in the detailed description of the preferred embodiments when taken in conjunction with the accompanying drawings in which:

FIGS. 9A and 9B diagrammatically illustrate a duck-bill valve;

DETAILED DESCRIPTION OF THE PREFERRED EMBODIMENTS

Figure 1:
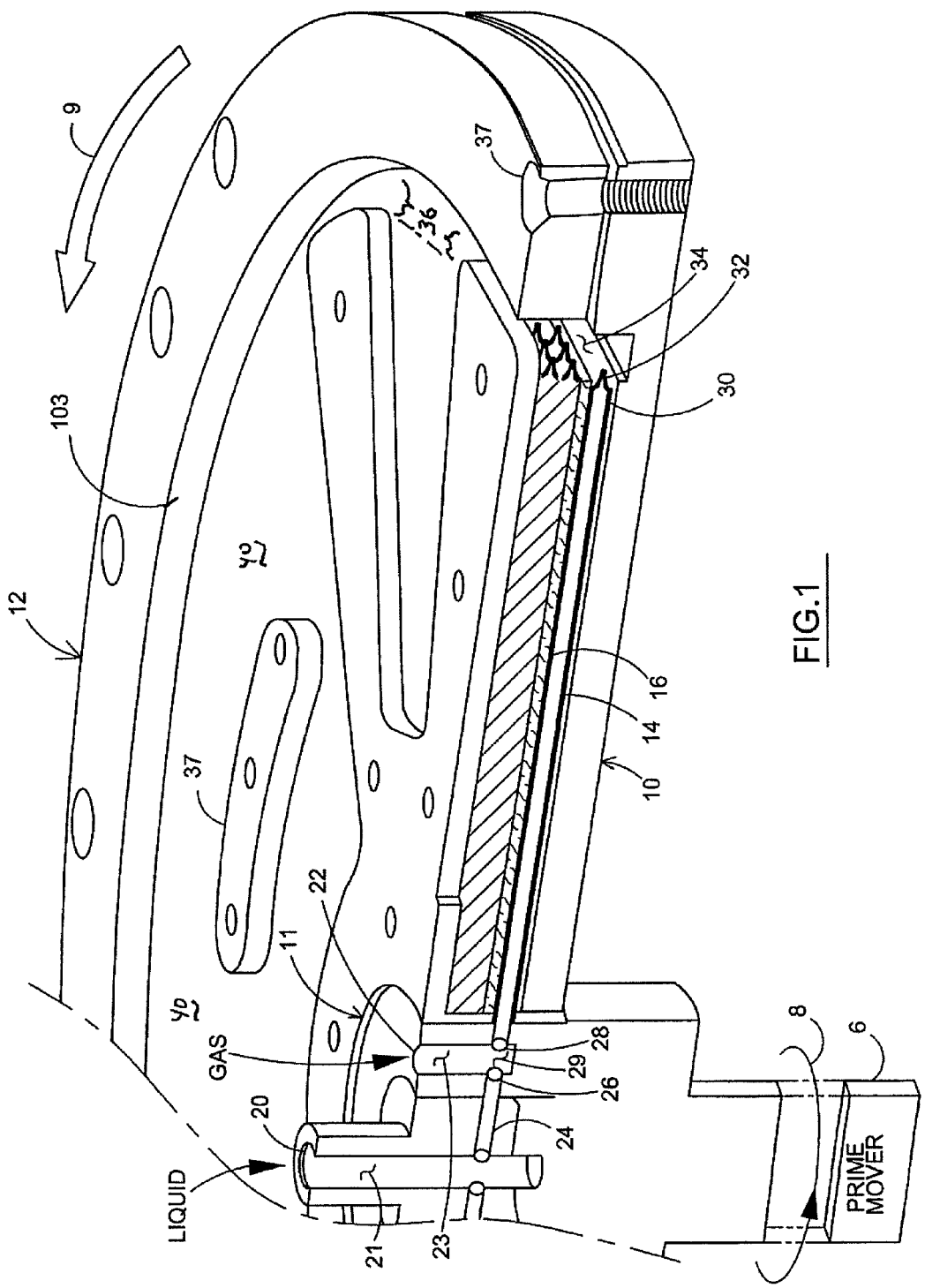
FIG. 1 diagrammatically illustrates one capillary tube which compresses gas in an emulsified liquid-gas mixture (these tubes may be in a single plane or disk, and/or configured as a stack of discs (as schematically shown in FIG. 1))

The present invention relates to a method of compressing gas in an emulsified liquid-gas mixture and a centrifugal gas compressor. Similar numerals designate similar items throughout the specification and the drawings.

One embodiment of the present invention includes a flat aluminum disc or back plate 10 (FIG. 1) with two shallow generally radial pockets milled into one side. These milled pockets are sealed into hydraulic passages by the gasket 16 and a polycarbonate cover plate is placed over top of the gasket (not shown). A plurality of capillary tubes (see tube 14) may be disposed or formed on the disc. The disc is secured by an aluminum clamp ring and face washers and through-bolted (see bolt hole 37, FIG. 1) to the aluminum back plate 10. A central brass hub is bolted to the aluminum back plate 10. The brass hub, holding emulsification device 11, is machined to provide a sealed liquid inlet 20 on the front side, and a sealed pressurized gas harvest port 60 (FIG. 2), on the rear. Capillary compression tubes 14 are mounted in the channels in the milled pockets on the aluminum back plate 10 in a nominally radial orientation with inlets 28 at the proximal ends (near the axis of rotation) set inside the ambient gas inlet 22, 23 and just distal to the emulsion ejector 26 exit. Liquid is fed into port 20 and is fed through channel 24 and is ejected from outlet port 26. The liquid jet then mixes with the gas in venturi jet region 29 to form a venturi generated emulsification of gas and liquid which is injected into capillary port 28.

Nominally pressurized water (or other liquid) is introduced into the sealed liquid delivery port 20. Two small jet ejector tubes, one on each side, see ejector port 26, carry liquid from the sealed liquid delivery port 20, 21 and form liquid jets aimed at the radially inboard ends 28 of the capillary dimension compression tubes 14. The liquid jet crosses a gap 29 which is open to a gaseous environment. The venturi effect created by the liquid jet as it enters the entrance of the compression tube 14 traps and entrains small bubbles of gas which then form an emulsified gas-liquid mixture, and, when in the capillaries 14 form a bubble train inside the compression tubes 14. See FIG. 11 as an example.

Figure 12:
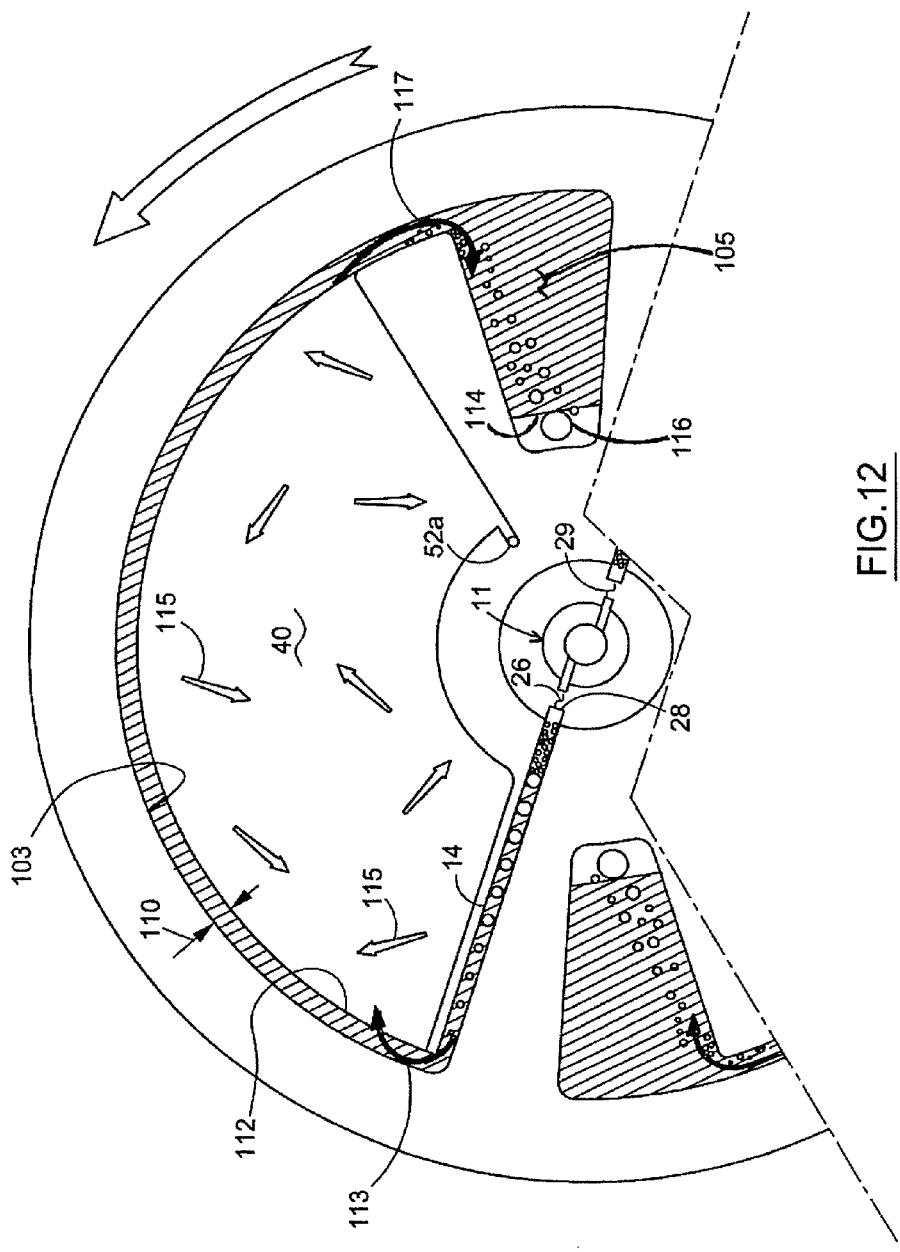
FIG. 12 diagrammatically illustrates compressed gas in the arcuate gas collection space of the disc and the gas blowoff exit port.

The pressurized gas-liquid emulsion mixture, at the radially outboard ends of the compression tubes 14, exits the compression tube outlet port 30, whereupon the newly unconstrained gas fraction, pressurized gas (see FIG. 12), of the compressed gas-liquid emulsion mixture is immediately subject to buoyancy and floats towards the center of rotation in the form of bubbles, separates from the liquid fraction (see outermost peripheral collection region 110 in FIG. 12) and is trapped inside the compressed gas chamber 40 (FIGS. 1 and 12). See flow 113 of compressed emulsified gas liquid in FIG. 12. The liquid fraction of the emulsion mixture in region 110, FIG. 12, exiting the radially outboard ends 30 of the compression tubes 14, being denser than the gas fraction in this radially constrained emulsion (in region 110, emulsion is constrained by centrifugal forces), is forced to the radially outboard hydraulic limits of the milled pockets in liquid drain column space 105 the aluminum back plate 10 and into the liquid drain port 116, FIG. 12. As pressurized gas 115 (FIG. 12) fills the pressurized gas storage chamber 40 (FIGS. 1, 12), the liquid level of the separated liquid in the pressurized gas storage chamber 40 is forced in the radially outward direction to peripheral collection region 110 by the building pressure (FIG. 12) against the inboard surface 103 of the peripheral wall of gas collection region 40. Separated liquid in liquid drain collection region 105 (FIG. 12) passes through the device and leaves through the drain/blow off port 116 and up to the drain/bluff where it is released from the gas compressor.

Figure 2:
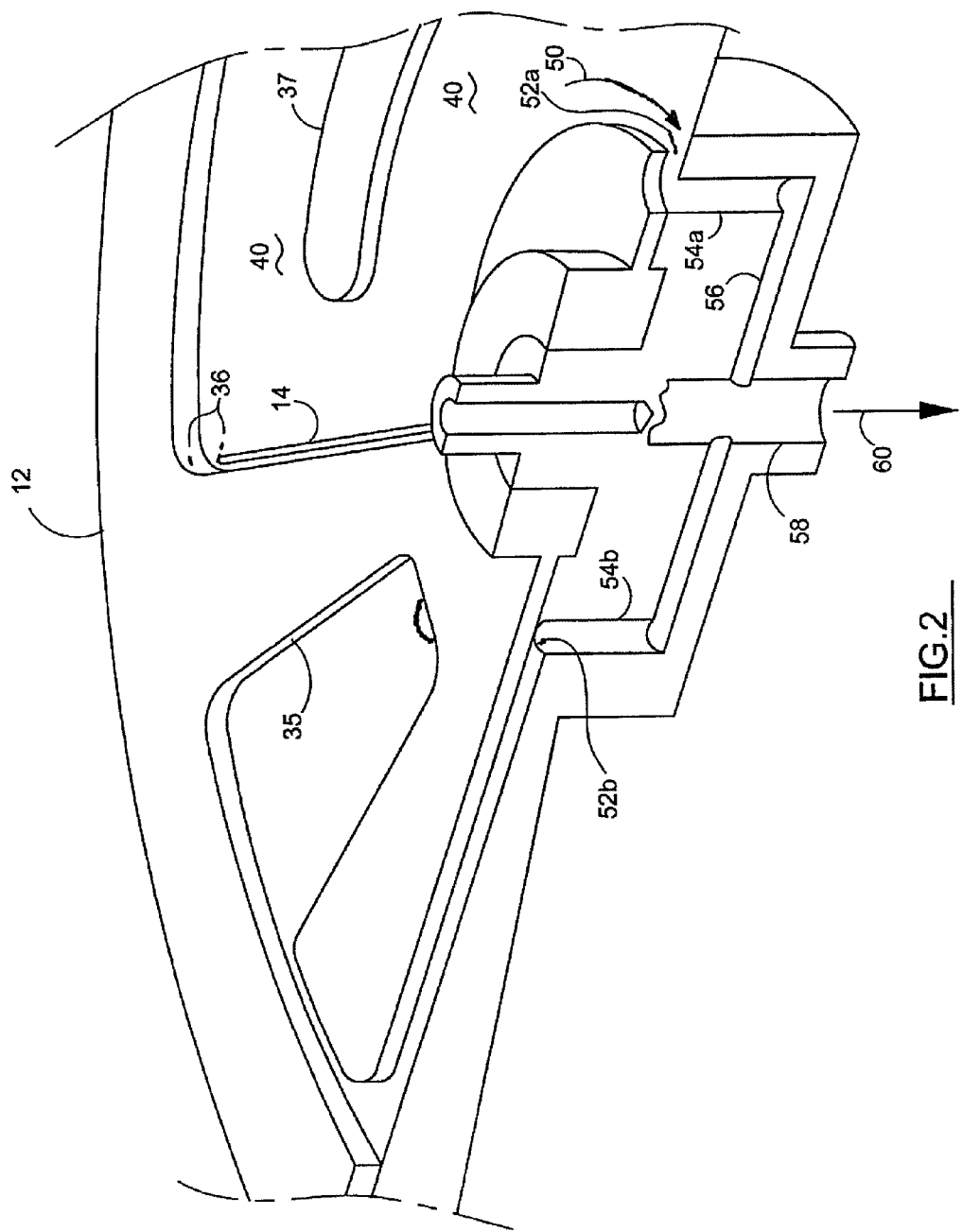
FIG. 2 diagrammatically illustrates the disc with compressed gas exit ports at inboard locations in arcuate peripheral container disk regions.

Drain/blow off port 116, FIG. 12, is open to atmosphere at a hydraulically higher elevation than the liquid pressure seal level in liquid drain column space 110, and the radial elevation difference, combined with the angular velocity, liquid density, and gas density, determines the maximum pressure the device will generate. Pressurized gas 115 continues to be captured in the compressed gas chamber 40, increasing in volume and forcing the liquid level in drain collection space 105 inside the chamber in the radially outward direction until reaching the level of the liquid seal level 110 at which point the gas trapped in the compressed gas chamber 40 creates a gas blow-off condition, wherein gas bubbles escape under the liquid seal level arrow 117, FIG. 12, on the radially outward side and then float radially inward to the drain/blow off port 116 where the excess gas pressure is released to atmosphere, acting as a protective pressure release mechanism that prevents the compressor from exceeding its maximum pressure limit. Pressurized gas 115 in the compressed gas chamber 40 is harvested through the pressurized gas harvest ports 52a (FIG. 2, 12) in the aluminum back plate 10 and brass hub or emulsification device 11, where it exits the device through a pressurized rotary seal port 60 via passages 54a, 56, 60 (FIG. 2).

In one embodiment, a single layer of capillary tubes 14 is disposed as a disc. In other embodiments, stacked discs are used to compress the gas. FIG. 1 diagrammatically illustrates a single capillary tube 14, and only graphically shows stacks of tubes. Each disc carries a plurality of capillary passages 14 thereon. In one embodiment, these capillary passages 14 are laid onto aback plate and a gasket 16 is placed over atop the plurality of capillary passages 14 generally disposed radially on back plate 10. In one embodiment, back plate 10 is aluminum and the gasket is interposed between layers of capillary passages 14. A polycarbonate cover plate (not shown) on the tubes over the gasket is also used. As described in U.S. patent application Ser. No. 14/280,780 (incorporated herein by reference thereto), the capillary passages need not be in a direct radial line (as "spokes") but may be generally radially positioned, tangential to the axis of rotation (see prime mover 6 and rotation 8 and disk rotation 9). Further, the capillary passages may be axially stacked in the disk in an offset manner and the main longitudinal body of the capillaries may be curved either in the direction of rotation 9 or counter the direction of rotation 9. The stacked tubes are only graphically shown in FIG. 1.

An emulsification device 11 is radially inboard with respect to the capillary passages 14. Liquid is injected or otherwise directed into port 20 of the emulsification device 11 and the liquid passes through axial channel 21. The liquid is ejected via generally radial channel 24 and ejected out of output port 26. The U.S. patent application Ser. No. 14/280, 780 discloses several types of emulsification devices for centrifugal gas compressors.

Gas is fed into the emulsification device 11 via port 22 and passes through a gas port 23. When the ejected fluid leaving exit port 26 and intersects the gas in region 29, a venturi jet effect is created thereby creating an emulsified liquid-gas mixture which is forcibly directed into input port 28 of capillary 14. See FIG. 11. As described in detail later, the gas in this emulsified liquid-gas mixture is compressed as it passes from a radially inboard proximal region to a generally radially outboard distal region at capillary exit port 30.

In the illustrated embodiment, to create substantially radially outboard flow of the compressed gas-emulsified liquid mixture (stated otherwise, limiting substantially radially inboard flow), the terminal exit end 30 of capillary 14 has a duck bill one-way valve 32. After the compressed gas-liquid emulsified mixture (the gas being compressed due to increasingly greater centrifugal forces acting thereon) exits port 30 and valve 32, it enters a generally arcuate peripheral container space disk region 34 leading to arcuate peripheral disk region 36.

A plurality of one-way duck-bill valves at the ends of a number of capillaries is graphically shown in FIG. 1 (not numbered) indicating that the disc is formed with a plurality of capillaries formed as discs which discs are stacked one atop another to form stack 12. For more details of stacked capillary discs, reference is made to Ser. No. 14/280,780.

The arcuate peripheral disk region 34, 36 has several collection spaces including a compressed gas collection space 40 generally radially inboard in the compressor from a compressed gas-liquid emulsified mixture region 36. See also emulsified mixture collection region 110 in FIG. 12. Gas collection region 40 is formed by disk plate separators having leg spacers 33, 35 and disk plate separation islands 37 or cover plate washers.

FIG. 2 diagrammatically illustrates compressed gas drains 52a, 54a, 56 from the compressed gas collection space 40. Once compressed gas bubbles emerge from the emulsified compressed gas-liquid mixture in arcuate peripheral disk region 36 (see emulsified mixture collection region 110 in FIG. 12), the gas fills compressed gas space 40 and ultimately this compressed gas exists space 40 via gas drain 52a. The compressed gas flow is shown by arrow 50 in FIG.

2. The compressed gas drain leads to an axial passage 54*a* and then a radial passage 56 to a central axial gas output port or passage 60. Compressed gas is drawn off from gas collection space 40 via gas drains 52*a*, 52*b*, passages 54*a*, 54*b*, and axial passage 58. Blind holes are not shown in these drawings.

FIGS. 3, 4, 5, and 6 diagrammatically illustrate the operation of the flow restriction elements to achieve one-way flow from radially inboard portions of capillary tube 14 to a radially outboard tube port 30. Although FIG. 1 shows a duck-bill one way valve 32 at output port 30 of capillary 14, the one way or flow restriction element can be placed at any designed location in the capillary tube. One or more one-way valves may be disposed along the capillary tubes. Different gasses, with different solubilities for different liquids may require one or a plurality of one way flow restriction elements to achieve the one way flow of compressed gas-liquid emulsified mixture through the capillary tube 14. The drawings herein are only illustrative of the location and type of one-way flow or rectifying flow valves.

One way flow of the emulsified liquid gas is achieved by limiting substantially radially inboard flow, which outboard flow causes the gas bubbles in the emulsified mixture to compress as the liquid slug of the mixture moves radially outward due to centrifugal force. In general, the liquid in the emulsified mixture is substantially incompressible as compared with the gas bubbles.

The term "compressed gas-liquid emulsified mixture" and other similar terms are meant to encompass compressed gas bubbles entrained in a liquid.

Figure 3:
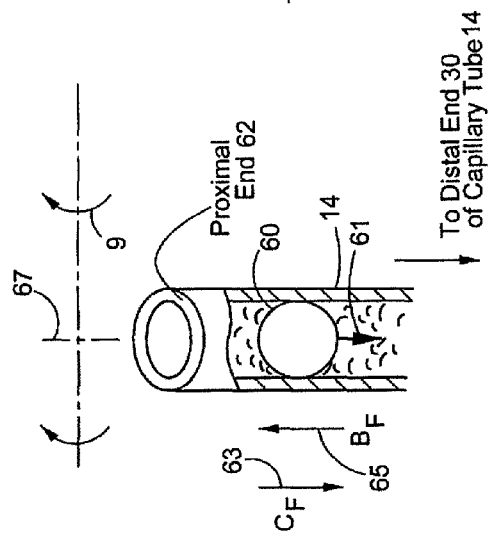
FIG. 3 diagrammatically illustrates centrifugal forces and buoyancy forces acting on a bubble in a capillary passage.

FIG. 3 diagrammatically illustrates the forces on a gas bubble as it passes through capillary tube 14. Tube 14 has a proximal end 62 which is radially near the axis of rotation 9 of the rotating system. Capillary 14 generally has a longitudinal axis 67. Centrifugal flow CF in direction 63 acts on the liquid thereby pushing bubble 60 radially outward in direction 61. However, the buoyant force BF as shown by arrow 65 counteracts the centrifugal force CF and acts to move the bubble radially inward. If the buoyant force BF is larger than the centrifugal force CF, the entrained bubble in the liquid will move radially inboard and the gas bubble 60 will not be compressed. By limiting and restricting the inboard flow of the emulsified mixture, the gas bubbles can only flow radially outward along with the liquid slug forming a compressed gas-liquid emulsification in the capillary tubes. As the entrained gas bubbles in the liquid reach the radially outward portion of the rotating disk, the gas bubbles compress. This compressed gas-liquid emulsified mixture releases the compressed gas in container disc space 40.

Figure 4:
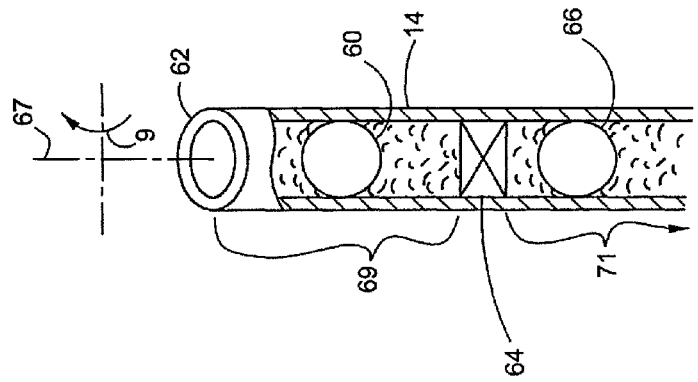
FIG. 4 diagrammatically illustrates a capillary passage with several gas bubbles entrained in a liquid and a one way valve disposed in the capillary passage.

In FIG. 4, capillary tube 14 has a radially inboard port 62. At the radially inboard region 69, a gas bubble 60 forms in the emulsification. One way valve 64 (diagrammatically illustrated) prohibits backflow of the entrained gas bubble and liquid. Therefore, the liquid holding the gas bubble 66 cannot pass radially inboard towards entrance port 62 because such flow is blocked by the diagrammatic one-way valve 64. Radially out board flow is promoted in distal region 71 of capillary tube 14.

Figure 5:
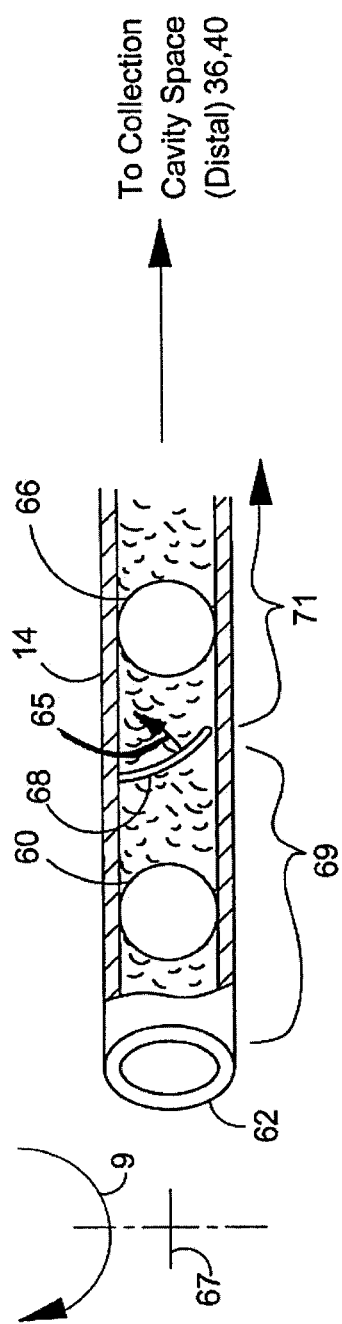
FIG. 5 diagrammatically illustrates a different one-way valve disposed in a capillary passage.

FIG. 5 diagrammatically illustrates that the one-way valve is a flap valve or a swing valve. In either case, swing valve 68 acts as a mechanical check valve which prohibits liquid and the entrained gas bubbles 66 from moving radially inboard or towards input port 62 of capillary 14. The flap or swing element 68 of the valve moves in the direction 65.

Figure 6:
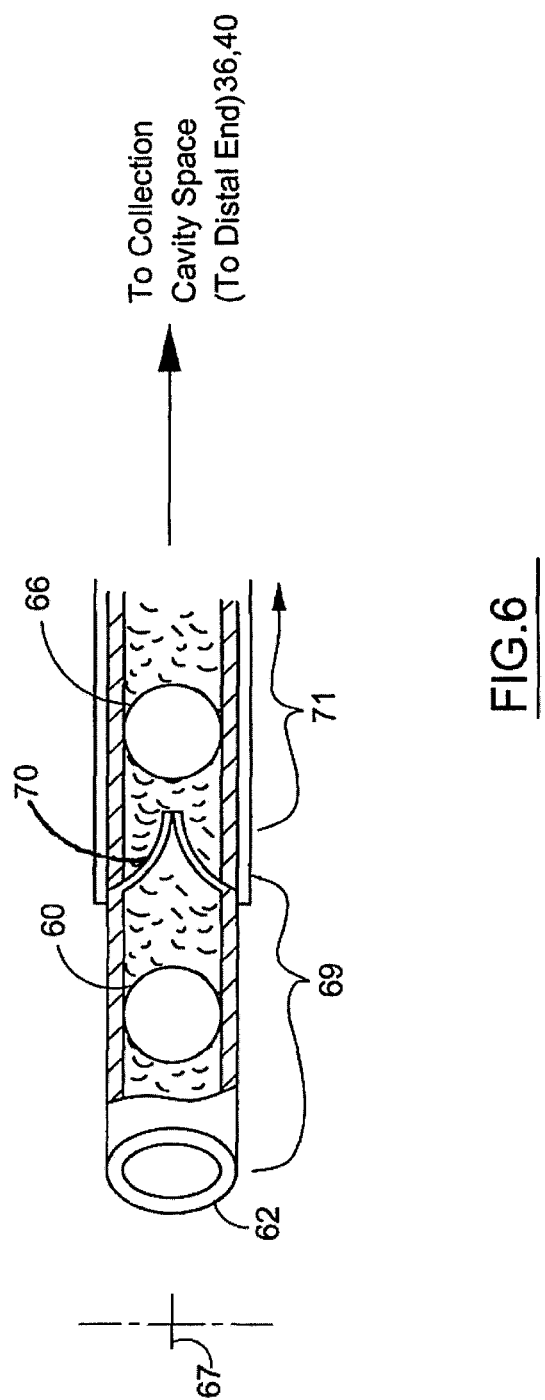
FIG. 6 diagrammatically illustrates a one-way duck-bill valve in a capillary passage.

FIG. 6 diagrammatically illustrates that a duck bill valve 70 that can be disposed at some intermediate position between input port 62 of capillary 14. This valve is also at distal region 36 or the terminal end 30 of the tube. See FIG. 1.

Figure 7A:
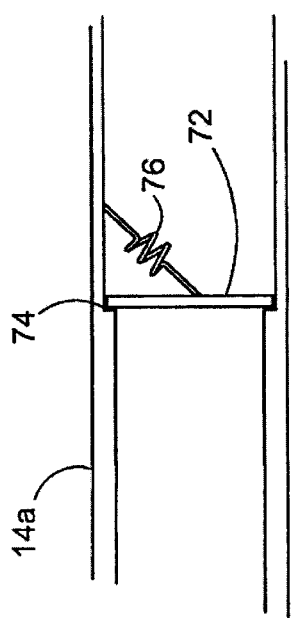
FIGS. 7A, 7B, and 7C diagrammatically illustrate other one-way valves and rectifying flow valves disposed in a capillary passage.

FIG. 7A diagrammatically illustrates a swing valve or a tilt disk valve having a pivoting flap member 72. A biasing element is diagrammatically illustrated as a spring element 76 in FIGS. 7A, 7B and 7C. However, any type of biasing element could be used such as a spring, compression member, compressible plug or pin, etc. The swing element 72 may be flexible such that the element creates its own biasing force (wherein spring 76 is illustrative of the push-back force created by the structural features of swing panel 72). The swing element 72 fits against seat 74 formed at the designed location of capillary 14*a*.

Figure 7B:
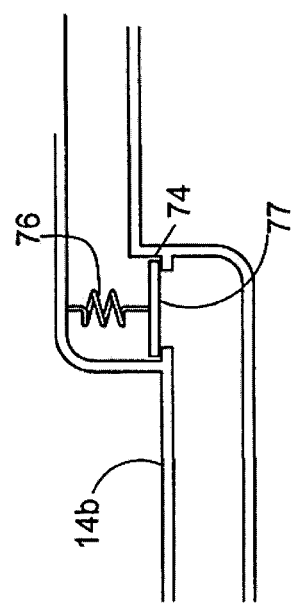

FIG. 7B shows a lift valve having a valve element 77 biased by biasing element 76 such that the lift element 77 seats against valve seat 74 in capillary 14*b*.

Figure 7C:
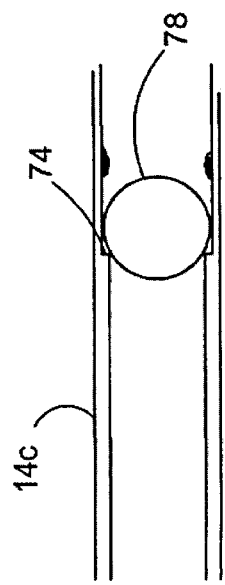

FIG. 7C diagrammatically shows a ball check valve having ball element 78 which seats against valve seat 74 in capillary 14*c*.

One-way valves are sometimes identified and discussed in the literature as rectifying flow valves. A rectifying flow valve permits flow in only one direction and blocks flow in the opposite direction. For example, rectified water flow is achieved on a macro scale when portions of waves crash over barrier walls. The wave passing over the wall is rectified unidirectional flow.

Figure 8:
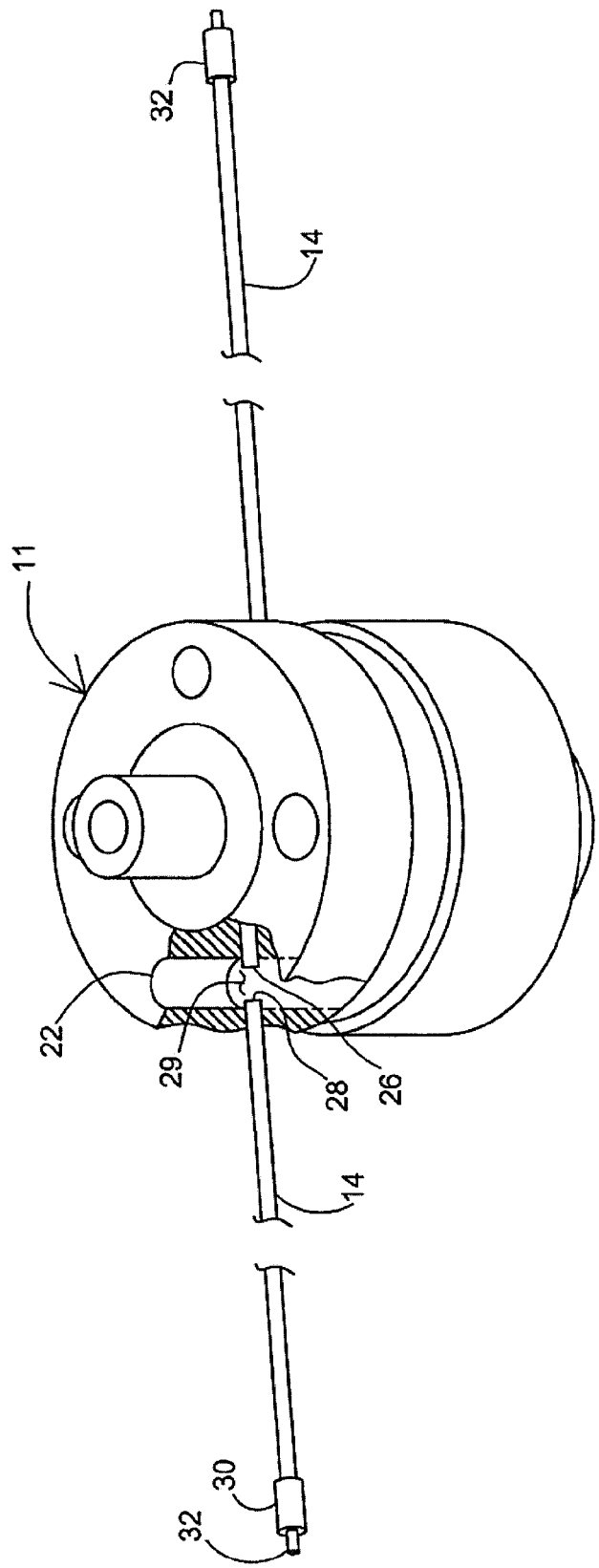
FIG. 8 diagrammatically illustrates operational elements of the emulsification device, several capillary passages and one-way valves near or at the terminal ends of the passages.

FIG. 8 diagrammatically illustrates an emulsification device 11 which is disposed at a radially inboard position (see FIG. 1) with respect to other items on the rotating disk found on back plate 10. U.S. patent application Ser. No. 14/280,780, incorporated herein by reference thereto, discloses several different types of emulsification devices for gas compressors.

In FIG. 8, gas is fed into input port 22 of emulsification device 11 and, in region 29, a venturi jet is created by liquid ejected from output port 26 into venturi jet region 29. The emulsified gas-liquid mixture is then forced into inlet port 28 of capillary tube 14. At the radially outer end 30 of capillary tube 14, a duckbill one-way valve 32 limits radially inboard flow and promotes radially output flow of the compressed gas-liquid emulsification mixture. The compressed gas emulsification is captured in space 34 in FIG. 1.

FIGS. 9A and 9B diagrammatically illustrate duckbill valve 32 which is mounted in or on capillary 14. As an example, dimension "a" is about 1.7 mm, length "b" is about 2.5 mm, and base dimension "c" is about 0.5 mm. In FIG. 9B, the length "d" is about 2.2 mm and the bill portion of the valve is slightly more than one half the length "d."

A discussion of creating, enforcing and enhancing unidirectional distal emulsion flow follows. Centrifugal force, acting on the mass of the slugs of liquid between bubbles (liquid mass×angular velocity squared×radius), drives the gas bubbles radially outward (distally) until the buoyant forces from the bubbles acting radially inward (proximally) equal or exceed the centrifugal forces, at which point a total rejection of new liquid from the jet ejector tubes occurs.

In one embodiment, the bubble train (see FIG. 10) acts similarly to a multiple mass-spring-mass-spring system with an inherent resonance, where the incompressible liquid slugs act as the mass and the compressible (flexible) gas bubbles as the spring. This resonance combines with the buoyant forces and centrifugal forces acting on the gas and liquid fractions of the emulsion to create an oscillatory behavior in bubble train which effectively restricts or even blocks the distal flow of liquid or gas in the compression capillary tubes within certain angular velocity ranges.

The device performs a given amount of work to push a given gas bubble within bubble train from the proximal to the distal end of compression tube 14. Any movement by said bubble in the proximal direction is lost work and lost productivity—lower efficiency—by the device. Creating, enforcing and enhancing distal unidirectional emulsion flow (bubble train) in compression tube 14 is therefore critical to efficient device operation.

The present invention can be modified to utilize a number of methods, individually or in combination, to create, enforce, and enhance distally oriented unidirectional emulsion flow (bubble train) in the compression tubes 14.

Figure 10:
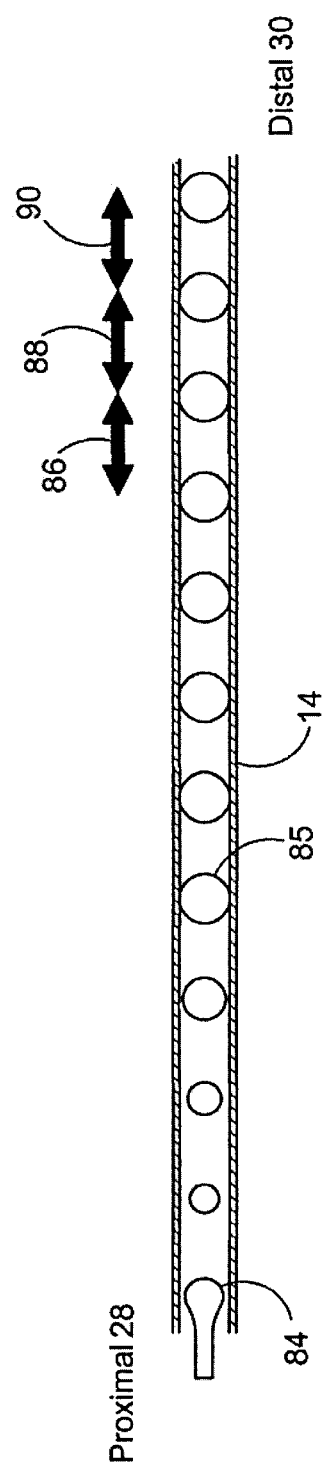
FIG. 10 diagrammatically illustrates formation of gas bubbles at a proximal end of the capillary passage and the hydraulic impedance effect formed at a distal region of the capillary passage with force arrows 86, 88 and 89 (the impedance effect operating on all the bubbles in the tube, not just at the distal bubble train, stated otherwise, the oscillatory forces act on all the bubbles in the tube, and the drawing only illustrates a few force vectors as an example)

FIG. 10 diagrammatically shows an early bubble formation 84 at proximal and 28 of capillary 14 and, at a radially distant position in the tube, a fully formed gas bubble. Force lines 86, 88 and 90 represent the mass-spring-mass oscillation of the hydraulic system caused by the liquid slugs passing through capillary 14, those slugs being generally separated by gas bubbles. Mechanical impedance is found in a mass-spring-mass systems. In physics, it is the ratio of the force on a system undergoing simple harmonic motion to the velocity of the particles in the system. Stated otherwise, mechanical impedance is a measure of how much a structure resists motion when subjected to a harmonic force. It relates forces with velocities acting on a mechanical system. The mechanical impedance of a point on the structure is the ratio of the force applied at that point to the resulting velocity at that point. See http://www.cqe.northwestern.edu/sk/EA3/EA3_weak_couple.pdf; and http://www.bksv.com/doc/17-179.pdf; and http://dictionary.reference.com/browse/mechanical-impedance; https://en.wikipedia.org/wiki/Mechanical_impedance; and http://www.engineering.ucsb.edu/~paden/ME104/notes/Phasor-analysis-of-mechanical-systems-rev-A.pdf Scientific literature also discusses hydraulic impedance. For example in an article entitled "Study on the Hydraulic Impedance of Surge Tank", the discussion centers around a calculation of hydraulic impedance of a surge tank, both a simple tank and a throttled tank. The effects of a surge tank on the hydraulic vibration of pressurized conveyance system of hydropower is the subject of the study. The investigation shows that the attenuation factors of system decrease if the hydraulic resistance coefficient of the surge tank increases. The hydraulic impedance of a hydraulic turbine has almost no effects on the frequency of the system which are close to the even order frequencies of pipe. See publication in IEEE Mechanic Automation and Control Engineering (MACE), 2011 Second International Conference on Date of Conference: 15-17 Jul. 2011 Page(s):2624-2627 Print ISBN: 978-1-4244-9436-1, author: Wen-tao Feng Therefore, the mass-spring-mass oscillatory action of the bubble-liquid slug train represents hydraulic impedance promoting unidirectional distal flow created in the capillary tubes. The impedance of the tube is the resistance to proximal or back flow of the bubble-liquid slug train. Stated otherwise, the compressed gas-liquid emulsion mixture passes through the capillary tubes in one direction radially outward towards the distal tube end.

With respect to radially outward flow of the compressed gas-liquid emulsion through the capillaries 14, it is believed that the bubble train shown in FIG. 10 is similar to multiple mass-spring-mass-spring systems with and inherent residence. The generally incompressible liquid slugs act as the mass and the compressible, that is generally flexible, gas bubbles act as springs in capillary 14. The oscillating behavior effectively restricts flow of emulsified compressed gas-liquid mixture through the compression tubes. With respect to FIG. 10, these forces 86, 88, 90 are acting upon all the bubbles in capillary 14, and are not limited to the illustrated last three or four bubbles at the distal end of the tube.

Several methods for creating distally oriented unidirectional emulsion flow are discussed below. Mechanical checking mechanisms are one class of device that can be added to the capillary compression tubes 14 to create complete unidirectional flow. This class includes swing-check, ball type, tilting disc type, in-line, lift-type, flap-type, and duckbill type devices, among others. Mechanical checking mechanisms can be placed anywhere along the length of compression tube 14, individually or serially, to create a condition wherein proximal emulsion flow in bubble train is impossible. One embodiment of this concept is seen in duck-bill check valves 32 (FIG. 1) at the radially outboard ends 30 of the compression tubes 14.

Enforced unidirectional flow in this device is also accomplished by using the following two methods.

Liquid ejectors in the emulsification device 11 provide the considerable, but incomplete, one way checking effect of distally directed kinetic energy via the inertia of ejector jet streams directed at the inlet ends or interim locations along the length of the capillary compression tubes. The distally oriented inertia (velocity times mass) of the liquid mass counteracts the proximally oriented buoyant force of gas bubbles in the inlet portion 28 of compression tube 14 and aids to maintain distally oriented emulsion flow. Proximally oriented emulsion flow or complete flow blockage can still occur once the reverse pressure exceeds the maximum pressure ratio of the ejector, but the liquid injectors (venturi set 26, 28, 29), in combination with other methods, act to reinforce the centrifugal forces acting on the liquid slugs pushing the gas bubbles distally in bubble train.

Tapered compression tubes (see FIG. 16A) are compression tubes 14 with diameters that decrease along their length moving from proximal end to distal end. In the case of isothermal compression, gas volume decrease is directly proportional to change in pressure. As an example; air being entrained in bubble train enters compression tube 14 at the proximal end and forms a full diameter bubble, sealing the liquid on either side of it. The pressure on the emulsion quickly increases as the bubble moves in the distal direction, with corresponding decrease in volume. The radius of a sphere decreases by the cube root of its volume, thus the bubble shrinks dramatically shortly after entering the tube and begins to pull away from full contact with the compression tube 14 walls but shrinks more slowly as it proceeds further distally in the compression tube. As long as the bubble maintains full diameter contact with the wall of the capillary tube, buoyancy—the tendency of liquid to find its own level—cannot act, however, if the liquid is permitted to slip past the bubble, buoyancy acts and the bubble experiences proximal movement relative to the liquid. The buoyancy of a bubble drops in proportion its reduction in volume and eventually is reduced to a degree that the bubble is no longer capable of developing a sufficient rate of rise through the liquid to overcome the distally oriented liquid velocity. Tapering compression tube 14 (FIG. 16A) is thus enforcing distally oriented unidirectional emulsion flow as long as the tube wall maintains full contact with the bubble. The rate of the compression tube 130 taper must be specifically engineered to the design operating parameters of the device, and is primarily determined by inner and outer diameter of rotation, liquid density, gas density, and rotational velocity.

Figure 17:
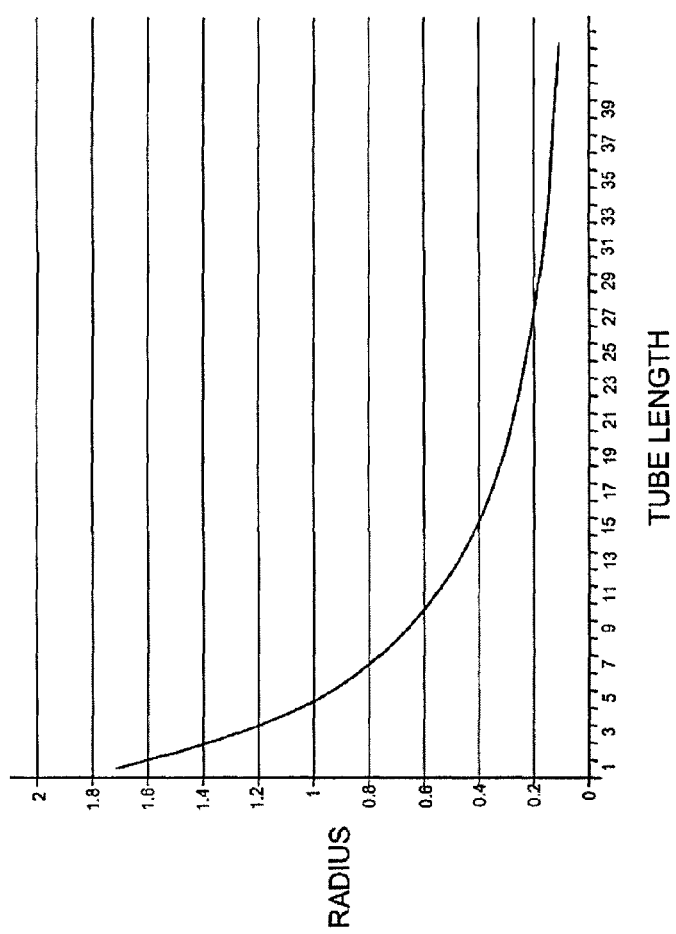
FIG. 17 diagrammatically illustrates the size relationship between the radius of the capillary passage (ID) as compared with the longitudinal length of the capillary passage.

An example calculation of the internal diameter of a tapered capillary compression tube at a specific radius is included as FIG. 17.

Methods for enhancing distally oriented unidirectional emulsion flow follow. Bubble buoyancy is the primary force opposing distally oriented emulsion inertia in a rotating frame of reference. It counteracts the liquid slug inertia as the buoyancy vector is always opposite the inertia vector of the slug and is only evident when liquid is permitted to pass around the bubble and displace the gas volume as it moves. Bubbles smaller in diameter than capillary tube 14 will permit liquid to pass around them in the distal direction, causing proximal movement of the bubble relative to the liquid, and act to resist liquid flow in the distal direction through friction.

The gas fraction of the gas/liquid emulsion entering capillary compression tube 14 is at its highest just distal of the proximal inlet 28 (see proximal bubble formation in FIG. 10). Using the Boyle's Law, the gas fraction of the emulsion decreases as it becomes compressed when the emulsion is forced distally through compression tube 14, giving the emulsion a higher unit density taking into account centrifugal forces. The acceleration and resulting inertia of the liquid mass as it moves through capillary compression tube 14, is the primary motive force driving the gas fraction to the distal ends and thus compressing it.

Figure 11:
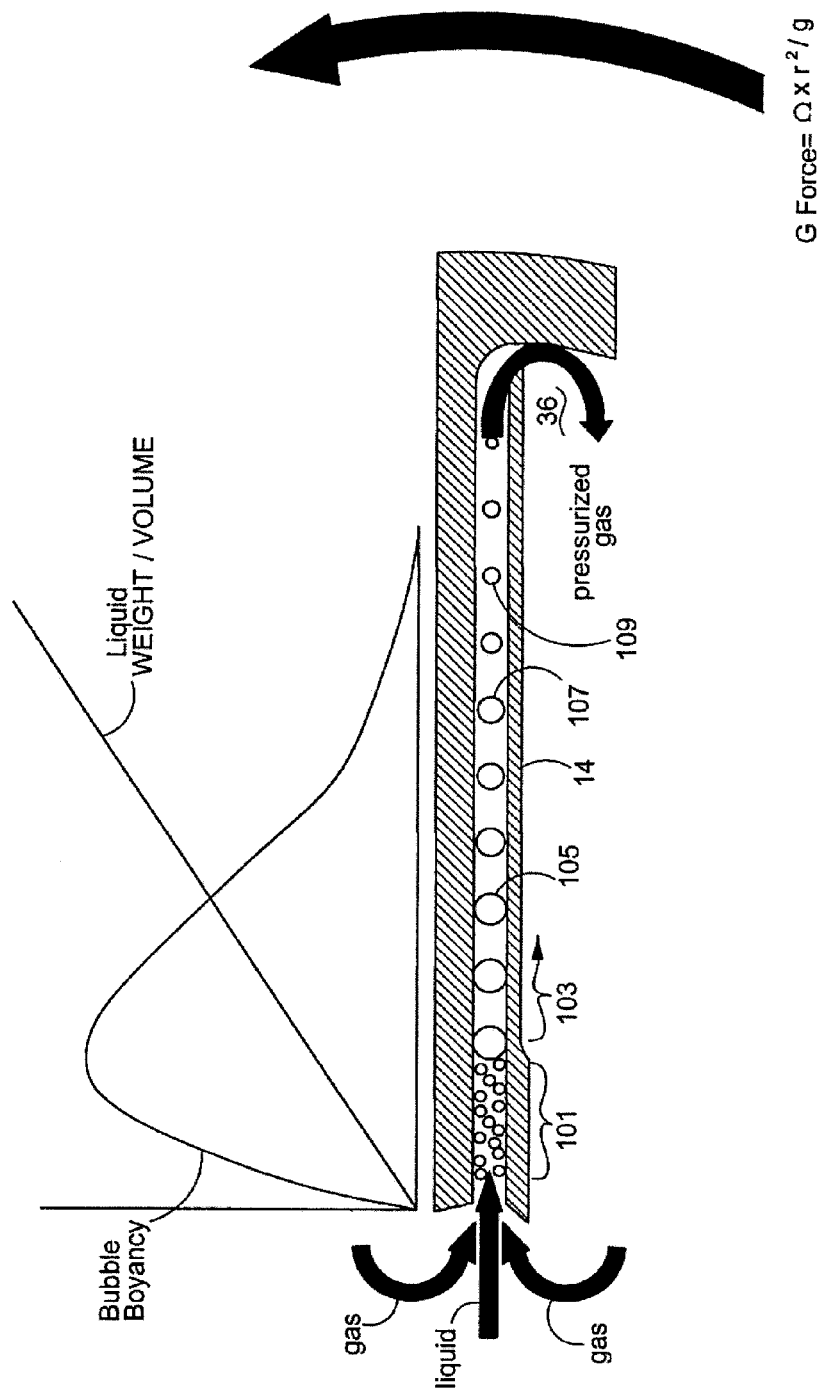
FIG. 11 diagrammatically illustrates the formation of large bubbles at the proximal end of the capillary passage, formation of larger bubbles at generally proximal locations, and at distal locations when the bubbles are compressed, the bubbles are reduced in size prior to exiting as compressed gas-liquid emulsified mixture in annular or peripheral region in the arcuate peripheral container space disk region.

FIG. 11 diagrammatically illustrates capillary tube 14, and, in distal mid-region 101 of tube 14, a series of bubbles and, in the downstream, distal region 103 and beyond, a series of other bubbles 105, 107 and 109. These further downstream bubbles 107, 109 become smaller due to compression of the gas. The compressed gas-liquid emulsified mixture enters arcuate peripheral container space disk region 36 as discussed in connection with FIG. 1 and as discussed later in connection with FIG. 12. The formula being:

Centrifugal Force equals $m\omega\omega r$.

Adjacent to capillary 14 is a force graph showing, along the Y—axis the bubble buoyancy force, which diminishes as the bubble moves radially from an inboard position to an outboard position in capillary 14. This bubble buoyancy curve is generally contrasted with the effective weight and generally constant volume of the liquid portion in capillary 14. The "effective weight" of the liquid slug being a function of the centrifugal force applied thereto. The entire system (capillary tube 14 and the traveling emulsified gas-liquid mixture) is effected by the rotational force or centrifugal force shown in FIG. 11.

Centrifugal force, acting on the mass of liquid slugs between bubbles drives the gas bubbles radially outward, that is in a distal direction, until the buoyant forces from the bubbles acting radially inward (that is proximal force) equal or exceed these inertial and centrifugal forces, at which point total ejection of new liquid from the jet ejector tubes 24, 26 (FIG. 1) occurs.

FIG. 12 diagrammatically illustrates a plan view of the disc. Liquid is ejected from the emulsification device 11 and from liquid ejection port 26. In space 29, which is flooded with gas, a venturi jet is created whereby an emulsified gas-liquid mixture enters input port 28 of capillary tube 14. As the entrained bubbles move radially outward, the gas is compressed and the compressed gas-liquid emulsified mixture exits the radially distal terminal end 30 of capillary tube 14 as shown by arrow 113. Since the entire system is spinning, the emulsified compressed gas—liquid mixture is initially disposed along the interior wall surface 103 near the output of the capillary tube. Highly compressed gas leaves the mixture in peripheral region 110, leaving a liquid fraction in region 110. The outer reaches of arcuate peripheral container space region 36 is peripheral collection region 110. Space 36 shown in FIG. 1 lies along the radially inboard wall surface 103 of the disc stack. Compressed gas bubbles emerge from the compressed gas-liquid emulsified mixture forced against interior wall 103 in the region 110 near outlet of tube 14 and the non buoyant compressed gas bubbles separate from this mixture flooding the larger gas containment space 40. In FIG. 12, this is shown by random gas arrows 115. The gas exits arcuate container space 40 at gas exit port 52a. See also FIG. 2.

As pressurized gas 115 fills the arcuate pressurized gas storage chamber 40, the liquid level in peripheral space 110 is forced in the radially outward direction and into liquid column drain region 105 by the building pressure. Separated liquid passes through the device and leaves through a drain or blow off port 116 where it is released from the compressor. Drain and blow off passage 116 is open to the atmosphere at a hydraulically higher level than the liquid pressure seal level at the radially outboard side of peripheral collection region 110. The water column in drain space 105 determines the maximum pressure that the compressor device will generate. Pressurized gas 115 continues to be captured in the compressed gas chamber 40, increasing in volume and forcing the liquid level (in defined space 110) to push liquid (see arrow 117) inside the chamber blow off space 105 until reaching the point wherein the gas trapped in the compressed gas chamber 40 creates a gas blowoff condition wherein gas bubbles escape under the liquid seal (see bubbles in arrow 117) on the radially outward side of peripheral space 105 and then float radially inward to the drain blowoff port 116 where the excess gas pressure is released to atmosphere, acting as a protective pressure release mechanism that prevents the gas compressor from exceeding its maximum pressure limit. Compressed gas forced into drain column 105 is released to the atmosphere, acting as a protective pressure release mechanism that prevents the compressor from exceeding its maximum pressure limit. Pressurized gas 115 in the compressed gas chamber 40 is harvested through the pressurized gas harvest ports 52a in the aluminum backplate 10 (FIG. 1, 2) and ultimately through the brass radially inboard hub where the compressed gas exits through a pressurized rotary seal port.

Figure 13:
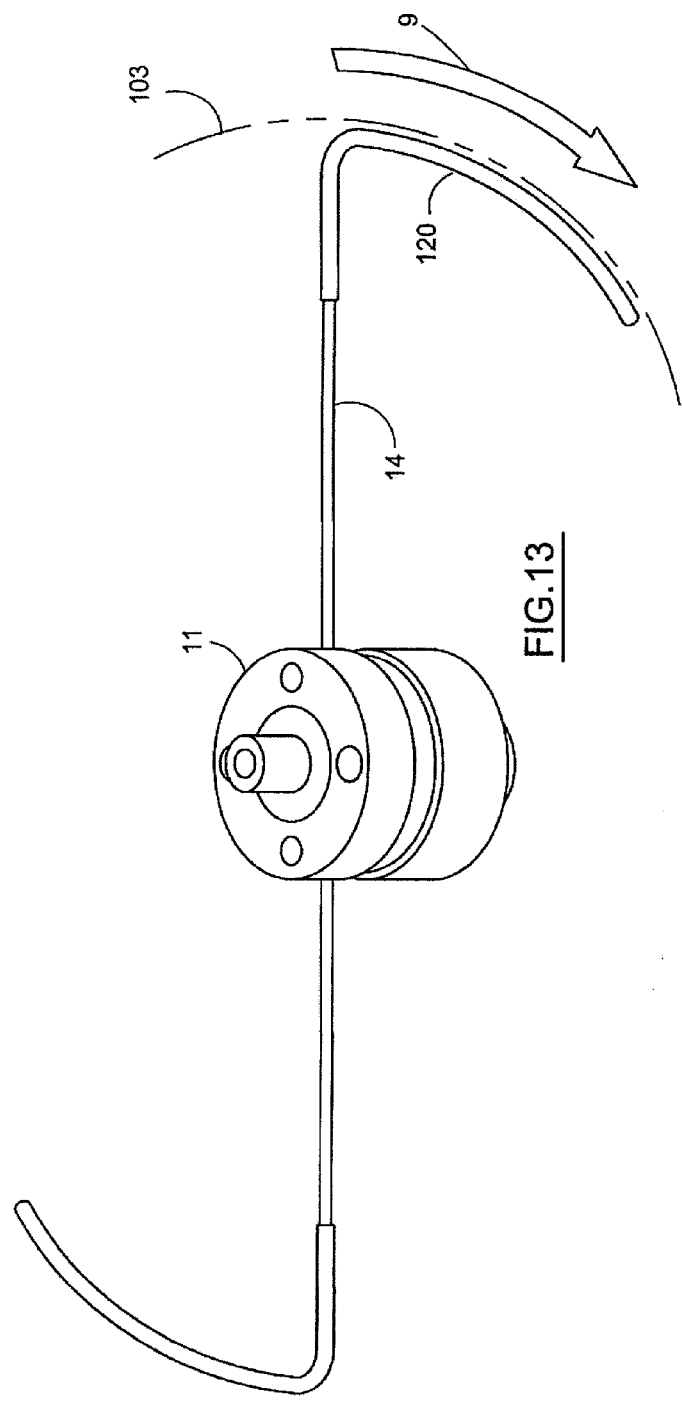
FIG. 13 diagrammatically illustrates capillary passages having tail end segments creating compressed gas-liquid emulsified mixture flow effected by Coriolis force in the tail ends.
Figure 14:
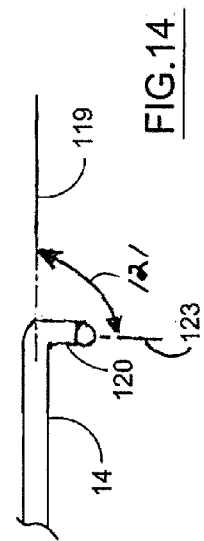
FIG. 14 diagrammatically illustrates an angular displacement of the capillary passage tail end segment.

FIG. 13 diagrammatically shows capillary tube 14 having a tail end segment 120 which is angularly displaced in the direction of rotation 9. The tail end segment in FIG. 13 is bent more than 90 degrees from the adjacent, axial centerline of the capillary tube. FIG. 14 shows capillary tube 14 with a tail end segment 120 angularly displaced about 90° from the generally longitudinal centerline 119 of capillary 14. See angular displacement 121 in FIG. 14. The tail end segment may be bent and may lay against wall 103 of container space 40. See FIG. 1 and diagrammatic line 103 in FIG. 13. The angular displacement is generally identified from the substantially radial axial centerline 123 of the capillary tube, upstream of the bent tail end segment.

Returning to FIG. 13, the tail end segment 120 generally follows the inboard surface plane 103 of the spinning disk. See FIG. 1. With the use of angularly displaced terminal end segments, radially inboard flow is limited and radially outward flow is promoted due to the Coriolis force developed in the terminal and segments. In physics, the Coriolis effect is a deflection of moving objects when the motion is described relative to a rotating reference frame. In a reference frame with clockwise rotation, the deflection is to the left of the motion of the object; in one with counterclockwise reddish rotation, the deflection is to the right. The Coriolis effect is in effect whereby a mass moving in a rotating system experiences a force (the Coriolis force) acting perpendicular to the direction of motion and to the axis of rotation. On earth, the effect tends to deflect moving objects to the west in the northern hemisphere and to the east in the southern hemisphere and is important in the formation of cyclonic weather systems. Otherwise, the Miriam Webster dictionary defines Coriolis force as an apparent force that as a result of the Earth's rotation deflects moving objects (as projectiles or air currents) to the right in the northern hemisphere into the left in the southern hemisphere.

The Coriolis effect in the tail end segments increases the separation of the entrained compressed bubbles against the side walls of the capillary tubes 14 thereby compelling the bubbles to be ejected from the output port of the tube.

Emulsion acceleration only occurs in the radial section of compression tube 14 and brings the emulsion to a maximum velocity approaching the radial speed of aluminum back plate 10 (FIG. 1) at tail end bend 120 (FIG. 13).

The compressed gas-liquid emulsion mixture captured in capillary compression tube 14 changes direction when it reaches the bend in the tail end. An empirical study has determined that a tail end bend when made at least normal to the plane of rotation, such that the outer radius of tail end bend reaches the outer design radius of compression, creates a condition which enhances and assists distally oriented emulsion flow. The tail end of compression tube 14 can lie flat against the radially outer, inner wall of pressurized storage chamber or can be bent further than 90°, back towards the axis of rotation (up, in a rotating frame of reference).

The direction that tail end bend faces impacts the performance of compression tube 14. The tail end bends in the plane of rotation and trailing the direction of rotation performed the best, and bends in the plane of rotation but leading the direction of rotation performed poorly, if at all. Tail end bends in either direction parallel to, but offset from the axis of rotation showed improved performance over compression tubes 14 with no tail end bend.

Figure 15:
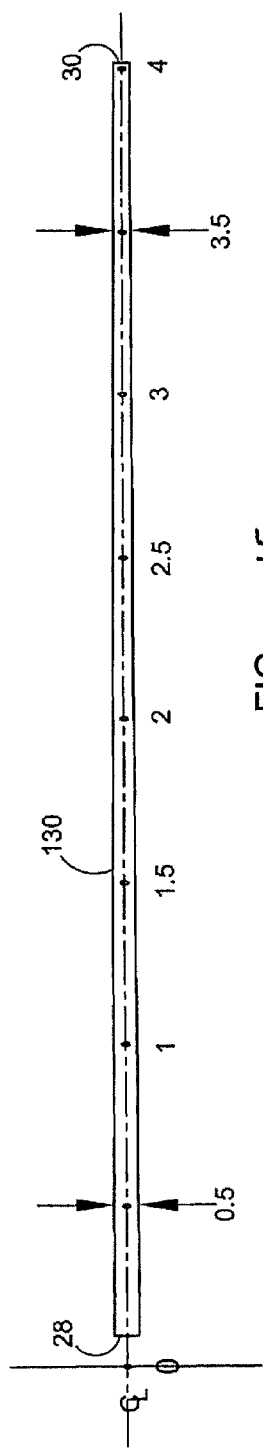
FIG. 15 diagrammatically illustrates a capillary passage which has a continuously smaller inner diameter (or inner flow passage) which creates one-way flow of the compressed gas—liquid mixture in the capillary passage.
Figure 16:
FIG. 16 diagrammatically illustrates a capillary passage that has a tube segment with a reduced flow passage segment compared with a larger, upstream proximal passage segment and a smaller distal downstream passage segment.

FIGS. 15, 16 and 17 diagrammatically illustrate another structure to restrict radially inboard flow of the entrained gas bubbles in the liquid and promote radially outward flow of the compressed gas in the gas-liquid in emulsified mixture. FIG. 16A diagrammatically illustrates that the capillary tube 130 can be tapered from its radially inboard port 28 to its radially distal port 30. In other words, at example tube length 0.5, the diameter or the interior passage cross-sectional dimension of the capillary tube is much larger as compared to example tube length distance 3.5 which has a much smaller cross-sectional passage area.

FIG. 16B shows that capillary tube 132 has a generally constant or uniform cross-sectional dimension extending from input port 28 until the longitudinal section 134. In section 134, the cross-sectional dimension of the capillary tube narrows until the tube reaches distal longitudinal section 136. At that point, the capillary tube has a constant, but a smaller, cross sectional passage flow. This leads to output port 30.

FIG. 16 graphically illustrates the change in the radius of a capillary tube as compared with the length of the capillary tube.

The claims appended hereto are meant to cover modifications and changes within the scope and spirit of the present invention.

What is claimed is:

1. A method of compressing gas in an emulsified liquid-gas mixture comprising:
    introducing the emulsified liquid-gas mixture into radially inboard ends of a plurality of capillary passages disposed in a rotating disk such that bubbles in said liquid-gas mixture are subjected to capillary action within respective ones of said plurality of capillary passages, and wherein radially outboard capillary passage ends terminate in one or more arcuate peripheral container space disc regions such that entrained gas bubbles are compressed as the emulsified mixture passes through the capillary passages and moves radially outward to the terminal capillary ends and into the arcuate peripheral space;
    limiting substantially radially inboard flow by restricting flow of the entrained gas bubbles through said capillary passages; and
    drawing off compressed gas released from the compressed gas-liquid emulsion in said arcuate peripheral space wherein compressed gas bubbles emerge from the peripherally collected emulsion.

2. The method of compressing gas as claimed in claim 1 wherein limiting radially inboard flow is effected by one or more of: a mechanical check valve; a one-way valve; a swing valve; a duck-bill valve; a lift check valve; an in-line check valve; a flap valve; a ball valve; a tilt disc valve; and a rectifying flow valve; and
    wherein said valve causing substantially radially outward flow through said capillary passages.

3. The method of compressing gas as claimed in claim 1 wherein limiting radially inboard flow is effected by a reduction of the physical size of the capillary passages along a respective longitudinal segment thereof thereby promoting substantially radially outboard flow there through.

4. The method of compressing gas as claimed in claim 3 wherein effecting substantially radially outboard flow is caused by one or more of: a narrowing of the capillary passages; a narrow longitudinal segment in the capillary passages; a mechanical check valve in the capillary passages; a one-way valve in the capillary passages; a swing valve in the capillary passages; a duck-bill valve in the capillary passages; a lift check valve in the capillary passages; an in-line check valve in the capillary passages; a flap valve in the capillary passages; a ball valve in the capillary passages; a tilt disc valve in the capillary passages; and a rectifying flow valve in the capillary passages.

5. The method of compressing gas as claimed in claim 1 wherein limiting radially inboard flow is effected by hydraulic impedance formed in said capillary passages thereby causing substantially radially outboard flow there through.

6. The method of compressing gas as claimed in claim 1 wherein causing radially outboard flow is effected by a coriolis force in terminal end tail segments of said capillary passages thereby causing an outboard flow through the tail segments.

7. The method of compressing gas as claimed in claim 6 wherein the coriolis force causes outboard flow in the tail end segments that are angularly displaced in the direction of rotation of the disc.

8. The method of compressing gas as claimed in claim 6 wherein the coriolis force causes outboard flow in tail end segments with capillary passages about 90 degrees displaced from upstream capillary passage axial centerlines.

9. The method of compressing gas as claimed in claim 6 wherein the coriolis force causes outboard flow in tail end segments having an angular displacement of 90 degrees or more from upstream capillary passage axial centerlines.

10. A centrifugal gas compressor fed with a gas and a liquid comprising:
- a rotating container with one or more discs rotated by a prime mover about an axis;
- a radially inboard emulsification device supplied with said gas and said liquid creating an emulsified liquid-gas mixture;
- each disc having a plurality of substantially radial capillary passages having radially inboard ends with radially inboard ports accepting said emulsified liquid-gas mixture from said emulsification device, such that bubbles in said liquid-gas mixture are subjected to capillary action within said capillary passages;
- said capillary passages having outboard terminal ends which terminate in one or more arcuate peripheral container space disc regions;
- restricting the flow of entrained gas bubbles and the liquid flowing through said capillary passages such that the entrained gas bubbles are compressed as the same passes through the capillary passages and move radially outward to the terminal capillary ends and the arcuate peripheral spaces;
- wherein the flow restriction of the entrained gas bubbles in said capillary passages is effected by one or more of: a mechanical check valve, a one-way valve, a swing valve, a duck-bill valve, a lift check valve, an in-line check valve, a flap valve, a ball valve a tilt disc valve, a rectifying flow valve, a narrowing of the capillary passages and a reduction of the physical size of the capillary passages along a respective longitudinal segment thereof;
- wherein said flow restriction causes substantially radially outward flow of compressed entrained gas bubbles and liquid into said arcuate peripheral spaces;
- one or more gas drains from said arcuate peripheral spaces for drawing off compressed gas therefrom; and
- one or more liquid drains from said arcuate peripheral spaces for drawing off liquid therefrom; and
- wherein compressed gas bubbles emerge from the liquid in the arcuate peripheral spaces.

11. A centrifugal gas compressor as claimed in claim 10 wherein terminal end tail segments of said capillary passages are angularly displaced in the direction of rotation of the disc.

12. A centrifugal gas compressor as claimed in claim 11 wherein the tail end segments are curved at least 90 degrees from upstream capillary passage axial centerlines.

13. A centrifugal gas compressor as claimed in claim 12 wherein tail end segments have an angular displacement of more than 90 degrees from upstream capillary passage axial centerlines.

14. A centrifugal gas compressor fed with a gas and a liquid comprising:
- a rotating container with one or more discs rotated by a prime mover about an axis;
- a radially inboard emulsification device supplied with said gas and said liquid creating an emulsified liquid-gas mixture;
- said discs having a plurality of substantially radial capillary passages having radially inboard ends with radially inboard ports accepting said emulsified liquid-gas mixture from said emulsification device, such that bubbles in said liquid-gas mixture are subjected to capillary action within said capillary passages;
- said capillary passages having outboard terminal ends which terminate in one or more arcuate peripheral container space disc regions;
- restricting a flow of entrained gas bubbles flowing through said capillary passages such that entrained gas bubbles are compressed as the same passes through the capillary passages and move radially outward to the terminal capillary ends and the arcuate peripheral spaces;
- wherein the flow restriction of the entrained bubbles in said capillary passages is effected by terminal end tail segments of said capillary passages that are angularly displaced in the direction of rotation of the disc;
- wherein said flow restriction causes outward flow of compressed entrained gas bubbles and liquid from the end tail segments and the terminal capillary ends into said arcuate peripheral spaces;
- one or more gas drains from said arcuate peripheral spaces for drawing off compressed gas therefrom; and
- one or more liquid drains from said arcuate peripheral spaces for drawing off liquid therefrom; and
- wherein compressed gas bubbles emerge from the liquid in the arcuate peripheral spaces.

15. A centrifugal gas compressor as claimed in claim 14 wherein the tail end segments are curved at least 90 degrees from upstream capillary passage axial centerlines.

16. A centrifugal gas compressor as claimed in claim 15 wherein tail end segments have an angular displacement more than 90 degrees from upstream capillary passage axial centerlines.

* * * * *